Patented Feb. 22, 1944

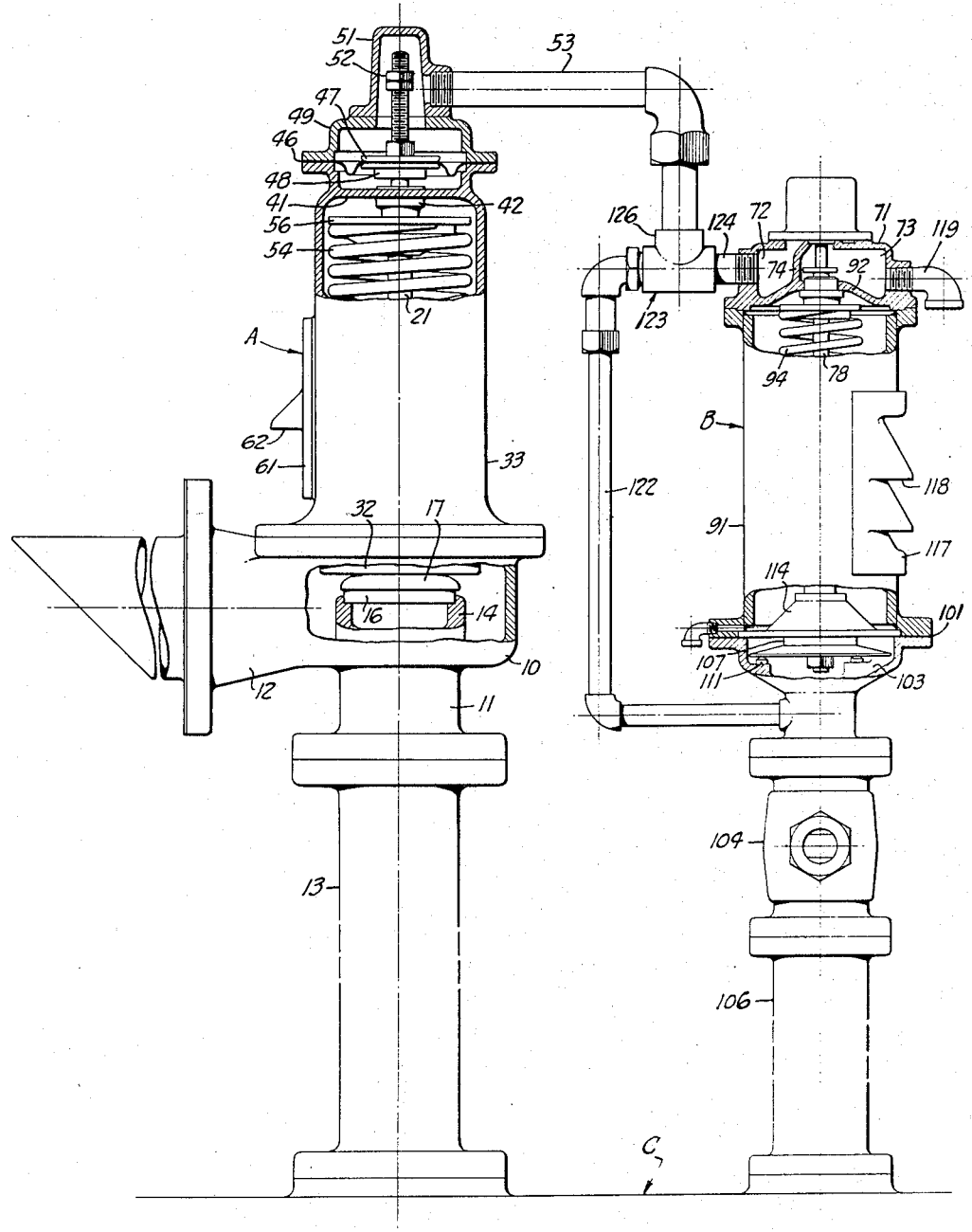

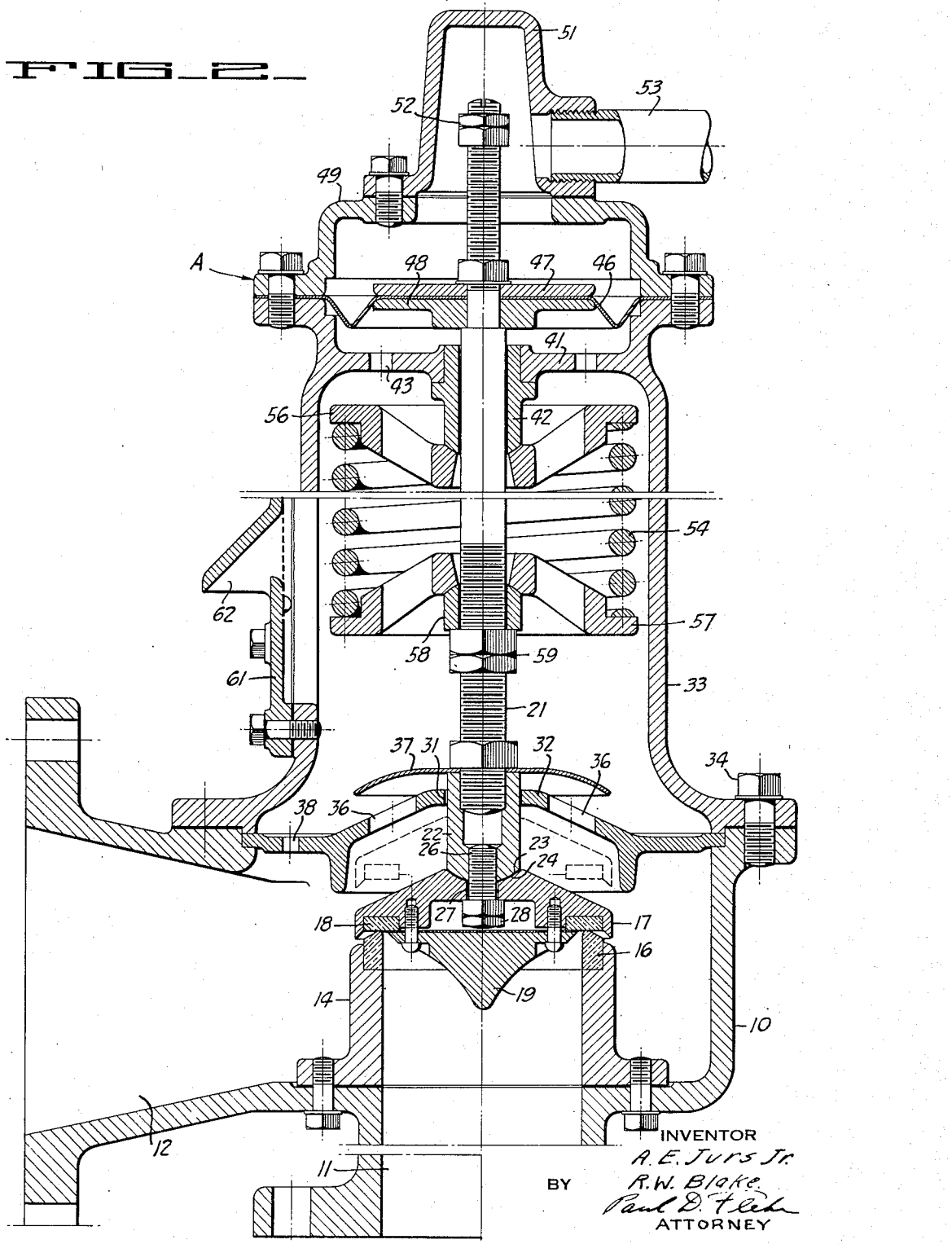

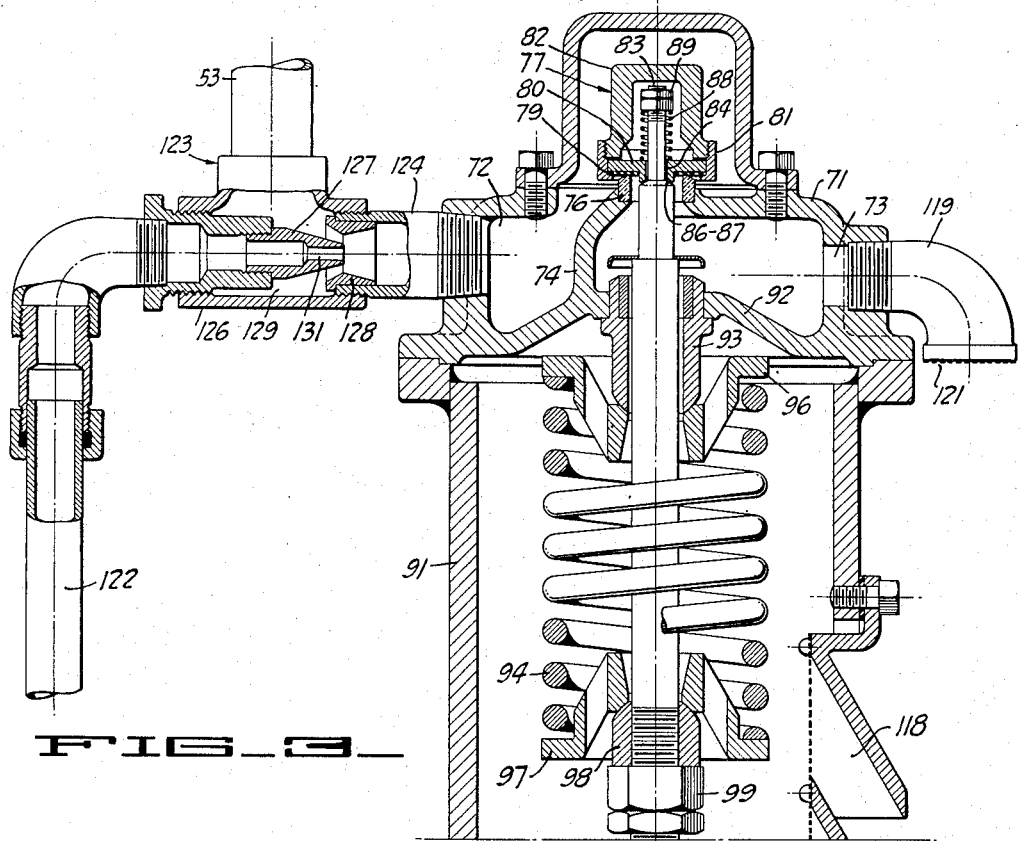
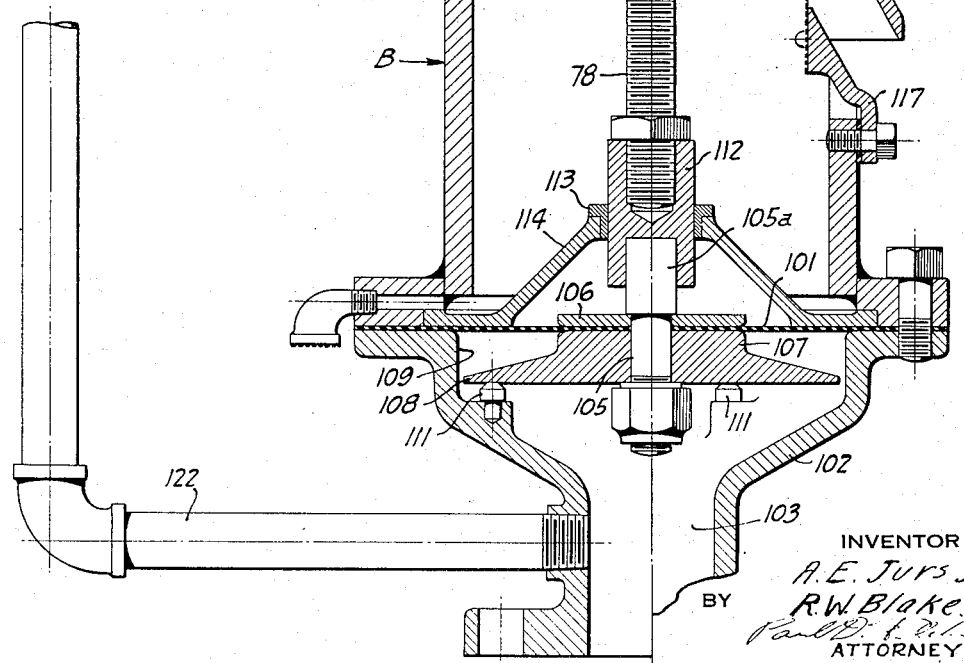
FIG_3_

2,342,472

UNITED STATES PATENT OFFICE 2,342,472

PRESSURE RELIEF VALVE

Albert E. Jurs, Jr., Berkeley, Calif., and Robert W. Blake, Chicago, Ill., assignors to Shand and Jurs Company, a partnership composed of Albert E. Jurs, Raymond M. Young, Peter C. Jurs, and Eugene E. Jurs Application December 23, 1942, Serial No. 469,916

2 Claims. (Cl. 137—53)

This invention relates generally to the construction of pressure relief regulators of the type suitable for protecting tanks or like pressure systems from excessive gas or vapor pressures.

It is an object of the invention to provide a relief regulator of the above character which will afford utmost protection for the tank or pressure system with which it is connected, and which will provide adequate forces for rapid, and positive, movement of the main valve pallet between closed and full open positions.

It is a further object of the invention to provide a pressure relief regulator having both fluid pressure operated and supplemental means for insuring closure against further venting of gas or vapor from a tank, and which supplemental means will act to effect a closure irrespective of failure of certain other parts of the equipment.

Another object of the invention is to provide a relief regulator in which the main valve member or pallet is definitely seated under pressure up to the moment it is moved to full open position.

Another object of the invention is to make possible complete inspection and disassembly of certain parts, including particularly the pilot valve means, without losing more than a minor percentage of the normal tank pressure.

Further objects of the invention will appear from the following description in which the preferred embodiment has been set forth in detail in conjunction with the accompanying drawings.

Referring to the drawings:

Figure 1 is a side elevational view, partly in cross-section, illustrating apparatus incorporating the present invention and connected to a pressure tank.

Figure 2 is a side elevational view in cross-section, showing the construction of the main valve.

Figure 3 is the cross-sectional view in side elevation, showing the construction of the pilot valve and its associated aspirator.

The apparatus illustrated in the drawings consists generally of the main valve A in conjunction with the pilot valve means B. Both of these valves are interrelated and are connected to the pressure tank C. It is presumed that one wishes to prevent a given normal pressure within the tank from rising above a predetermined value, as for example say 100 lbs. per square inch.

The main valve A consists of a body 10 having inflow and discharge passages 11 and 12, the inflow passage being connected as by means of conduit 13 to the tank C. Within the body there is an annular portion 14 which surrounds the inflow passage, and which forms a mounting for the stationary seat ring 16. Above the seat ring 16, that is upon the discharge side of the same, there is a closure pallet or valve member 17. The lower face of this pallet is shown provided with an inset ring 18, to engage and seal upon ring 16. Both of these rings are made of suitable material which is not affected by the gases or vapors with which the apparatus is used, as for example molded Bakelite. The lower face of the pallet is also provided with a substantially conical shaped flow deflector 19, which tends to direct the flow of gas over the stationary seat ring 16, when the pallet is in full open position.

The closure pallet is attached to the lower end of an operating rod 21 in such a manner as to permit a certain amount of self-aligning movement. Thus the lower end of rod 21 is threaded into a bar 22, the lower end of which has a convex spherical surface 23 which is adjacent to a complimentary concave spherical surface 24, formed centrally upon the upper side of pallet 17. A stud 26 is secured to the lower end of bar 22, and extends loosely through an opening 27 in the pallet. The lower end of this stud has the retaining lock nuts 28, whereby the pallet is permitted limited amount of play with respect to bar 22, thus enabling the pallet to have a measure of self-aligning action. Bar 22 in this instance is non-circular in transverse cross-section, as for example hexagonal, and is slidably guided within the opening 31 of the body partition wall 32. Wall 32 extends generally between the main part of the body, and the housing 33, which is attached to the main body part by cap screws 34. It is desirable that this partition be shaped to generally embrace the pallet 17 when the pallet is in full open position as illustrated in dotted lines. Openings 36 in the partition serve to freely interconnect the spaces above and below the same. A projecting skirt 37 can be attached to the lower end of operating rod 21, to cause possible condensate to drain off through the outer partition opening 38. Near the upper end of the housing 33, there is another partition 41 which carries a guide bushing 42 for the upper part of operating rod 21. This partition is also provided with vent openings 43.

At the upper end of the operating rod 21 there is a flexible diaphragm 46, the central portion of which is attached to the operating rod and clamped between the diaphragm plates 47 and 48. The peripheral portion of the diaphragm is clamped between complementary flanges formed on the housing 33, and the cover 49. The cover includes a cap 51 which is secured to the cover for occasional removal. The upper end of the operating rod extends beyond the diaphragm into the cap 51 and is there provided with the lock nuts 52 or a similar shoulder. Cap 51 connects with the pipe 53, which leads to the pilot valve as will be presently explained.

Surrounding the main part of the operating rod 21 there is a compression spring 54 which provides a constant loading force acting downwardly upon the closure pallet 17. The upper end of this spring is seated upon a spider 56, which in turn seats upon the bushing 42. The lower end seats upon a spider 57 which engages a sleeve 58 about the rod 21. Sleeve 58 rests upon a shoulder formed by the lock nuts 59. One side of the housing 33 is preferably provided with a closure plate 61 which can be removed for adjusting the setting of lock nuts 59. This plate is also shown provided with an opening 62 for freely venting the interior of the housing.

The pilot valve means illustrated in Figure 3 consists of a body 71 provided with the inflow opening 72 and the venting opening 73. Within the body there is a bridge 74 separating the openings 72 and 73 and forming a mounting for the stationary seat ring 76. Cooperating with the stationary seat ring 76 there is a movable pilot valve member 77, which is moved between open and closed positions by the valve operating rod 78. Valve member 77 is formed of several parts assembled together, including the disc 80 which is provided with a surfacing 79 for contacting the seat ring 76. Both the disc 80 and the surfacing 79 are retained by ferrule 81 upon the cup shaped body 82. The upper end portion 83 of the operating rod 78 is formed on a reduced diameter, and extends loosely through opening 84 in the disc 80. Complementary spherical surfaces 86 and 87 are formed upon the operating rod and upon the lower face of the disc 80 respectively, in order to permit a limited amount of self-aligning movement between the valve member and the stationary seat ring 76. A light compression spring 88 has its lower end pressing downwardly upon the upper face of disc 80 and its upper end seating upon the lock nut 89. This serves to permit a certain amount of lost motion between the operating rod and the valve member 77, and when the valve member is raised with respect to the stationary seat to take up the lost motion, the complementary spherical surfaces 86 and 87 are brought into engagement.

Body 71 is mounted upon the upper end of a shell or body section 91 which encloses the operating rod 78 and associated parts. The lower wall 92 of body 71 is provided with a bushing 93, serving to loosely guide the upper portion of rod 78. A compression or loading spring 94 surrounds rod 78 and urges it downwardly. The upper end of this spring is seated upon spider 96, which in turn is seated upon the lower end of bushing 93. The lower end of the spring seats upon spider 97, which in turn is seated upon a collar 98, with the collar butting the shoulder formed by lock nuts 99. These nuts can be adjusted to vary the loading force exerted by the spring 94.

At the lower end of the shell 91 there is a fluid operated diaphragm 101, the peripheral edge of which is clamped between complementary flanges formed on the lower end of the shell, and the upper face of the lower body part 102. This body part 102 forms a fluid chamber 103 below the diaphragm, which connects through the valve plug 104 and conduit 106 with tank C. A stud 105 serves to clamp the central portion of the diaphragm 101 between the diaphragm plates 106 and 107. The latter plate is provided with a circular skirt 108, the outer periphery of which is in proximity with the adjacent cylindrical shaped surface 109 of the body part 102. The use of such a skirt in conjunction with the diaphragm assembly has been disclosed and in Jurs Patent 2,250,767, granted July 29, 1941. Briefly it forms a fluid pressure area which takes effect in the event of rupture of the flexible diaphragm 101, and which serves to continue operation of the pilot valve until the rupture is repaired. Downward flexing of the diaphragm is limited by the stationary stops or studs 111.

The upper end portion 105a of the stud 105 is socketed within the lower end of the operating rod extension 112. This extension rod is in turn rigidly secured to the lower end of the main operating rod 78, and it is loosely guided within a bushing 113 carried by the webbed supporting member 114. Thus when the diaphragm 101 is flexed upwardly by fluid pressure within the chamber 103, the operating rod 78 is moved upwardly against the force of spring 94, and when lost motion has been taken up between the complementary spherical surfaces 86 and 87 the pilot valve member 77 is lifted from its seat.

To facilitate access to the interior of shell 91, one side of this shell is shown provided with a removable cover plate 117, which has louvered openings 118 for free access to the atmosphere. When this plate is removed one can make adjustments of the setting of lock nuts 99, to vary the loading force exerted by spring 94. The outlet or discharge 73 has also been shown connected to a fitting 119 which has a screened opening 121 to the atmosphere.

With respect to the openings between the main and pilot valves, a pipe 122 connects with the chamber 103 below the diaphragm 101, and leads to an aspirator device 123. Pipe 124 connects from this device to the inlet 72 of the pilot valve, and a connection is also established to the pipe 53 leading to the main valve. The aspirating device 123 can vary in construction, but it is arranged to form restricted communication between the inflow passage 72 and chamber 103 (or the tank C) and also serves to aspirate or in other words form a substantial partial vacuum in the pipe 53 and the associated chamber of the main valve, when the pilot valve is open. In the particular construction illustrated the aspirator includes a body in the form of a pipe T 126, within which there is a nozzle 127 connected to the pipe 122. The end of this nozzle projects into a throat bushing 128 within the adjacent end of the pipe 124. The aspirated space 129 surrounding the nozzle 127, connects with the pipe 53. The orifice 131 through nozzle 127 is a substantial flow restriction to limit venting through pipe 122.

Operation of the complete apparatus can be outlined as follows: Normally both the pilot and main valves are closed and a pressure is maintained in pipe 53 and the chamber above diaphragm 46 corresponding to the tank pressure. When the tank pressure attains a predetermined value for which the pilot valve is set, diaphragm 101 moves upwardly to open pilot valve 77 and thus vent gas from pipe 124 to the atmosphere. Jetting of gas through orifice 131 causes an aspirating effect to rapidly exhaust gas from pipe 53 and the chamber above the diaphragm 46. This causes the main valve pallet 17, under the urge of pressure on its lower side, to move upwardly to full open position and thus directly vent gas or vapor from the tank. When the tank pressure falls to a somewhat lower value diaphragm 101 moves downwardly to close valve 77 and thus cause the pressure in the chamber above diaphragm 46 to again build up to that of the tank. This causes diaphragm 46 to move downwardly to again seat valve 17. In the event a failure occurs which prevents a building up of pressure above diaphragm 46, as for example a rupture of diaphragm 46 or failure of the pilot valve to close, the spring 54 causes a positive closure of valve 17 when the tank pressure falls to a pressure value below the pressures at which the pilot valve normally operates. Thus a waste of gas or vapor is avoided.

We claim:

1. In a pressure relief regulator for controlling flow of gas from a tank or like pressure system, in order to protect the same from excessive pressure, a main valve body having inflow and discharge passages, the inflow passage being adapted for connection with the pressure tank, a valve seat formed in the body, a valve member movable between open and closed positions with respect to the discharge side of the seat, a spring acting to urge the valve member against its seat and adapted to retain the valve member closed for all tank pressures below a predetermined value, a fluid operated diaphragm adapted to apply force to the valve member in a direction to urge the same against its seat, means forming a fluid chamber on one side of the diaphragm whereby fluid pressure in the chamber urges the diaphragm in the same direction as the spring, pilot valve means having an inflow passage and a discharge passage, a gas connection adapted to provide communication between the tank and the inflow passage of the pilot valve means, said connection including an aspirator having a chamber aspirated by flow of gas through the connection, and a gas connection between said last mentioned chamber and the chamber on one side of the diaphragm, said pilot valve means constructed and arranged to vent gas from said first mentioned connection when the pressure within the latter attains a predetermined pressure higher than the pressure required to overcome the spring, said aspirating means serving to immediately exhaust gas from the diaphragm chamber when such venting is caused to occur by the pilot valve means.

2. In a pressure relief regulator as in claim 1, in which the aspirating means includes a restricted nozzle receiving gas from the first named connection, and adapted to discharge gas to the pilot valve means, when the pilot valve means is open.

ALBERT E. JURS, Jr.
ROBERT W. BLAKE.